Patented Jan. 17, 1939

2,144,590

UNITED STATES PATENT OFFICE 2,144,590

METHOD OF PRESERVING RUBBER

Jan Teppema, Boston, Mass., assignor to Wingfoot Corporation, Wilmington, Del., a corporation of Delaware No Drawing. Application April 8, 1936,
Serial No. 73,301

7 Claims. (Cl. 18—50)

This invention relates to a method of treating rubber. More particularly, it relates to a method of preserving rubber by the incorporation therein of primary aromatic amine derivatives of thiaz thionium chlorides.

Numerous methods have been suggested for resisting the deterioration of rubber by ageing. It has now been discovered that a group of compounds derived from arylene thiaz thionium chlorides provides excellent materials for accomplishing this purpose.

The arylene thiaz thionium chlorides employed in the invention may be prepared by reacting a primary aromatic amine or its hydrochloride or certain other acid salts with $S_2Cl_2$. The preparation of these arylene thiaz thionium chlorides is disclosed in U. S. Patent No. 1,637,023 and German Patent No. 360,690 of 1922. In this reaction may be employed primary aryl amines and substitution products thereof which contain at least one amino group and one unsubstituted hydrogen in ortho position thereto. The products formed are of the probable formula

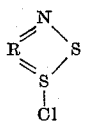

in which R is arylene. In some cases, besides the formation of this ring structure, a chlorination of the aromatic nucleus takes place. The chlorine here preferably seeks the position para to the original amino group and the tendency toward formation of such nuclear chlorinated derivatives is often so strong that, if this para position is occupied by easily split-off substituents such as sulpho, carboxyl, and nitro groups, these split off in the reaction and are substituted by chlorine. Thus, with aniline, a compound is obtained which has the probable formula

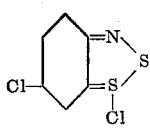

It is with this latter type of compound that the present invention is concerned.

The compound derived from aniline may be prepared by the following procedure:

One hundred kilograms of dry well ground aniline hydrochloride are heated in a suitable vessel fitted with a stirrer with five to ten times the quantity of $S_2Cl_2$ (a mol ratio of one of aniline hydrochloride to from 4.8 to 9.6 mols of $S_2Cl_2$) to 50–70° C. until a test sample can no longer be diazotized and coupled. The product is diluted, with an anhydrous, inert diluting agent such as naphtha, benzene, ligroin, etc., the separating body is removed by suction, washed with one of the hydrocarbons mentioned, freed from any excess of $S_2Cl_2$ that may adhere to it, and dried, preferably in a vacuum at as low a temperature as possible.

Further details and modifications of the foregoing procedure are outlined in the aforementioned U. S. Patent No. 1,637,023 and German Patent No. 360,690 of 1922.

Other representative amines which may be used instead of aniline are ortho and meta toluidine, para xylidine, alpha naphthyl amine, ortho and meta amino diphenyl, chloranilines, ortho and meta chlortoluidines, ortho and meta aminophenol, p-anisidine, phenetidine, etc.

It is disclosed in U. S. Patent 1,637,023 and German Patent 360,690 and treated in more detail in German Patent 487,849 that these reaction products may be further reacted with primary aromatic amines and other compounds to replace the chlorine of the arylene ring.

Thus, 3-methyl 5-chlor 1-2-phenylene thiaz thionium chloride of the formula

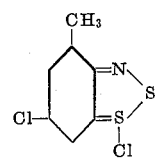

may be reacted with aniline as follows:

Forty-eight kilograms of 3-methyl 5-chlor 1-2-phenylene thiaz thionium chloride is finely powdered and introduced, with stirring, into a solution of 41 kilograms of aniline in approximately 60–70 kilograms of glacial acetic acid or the corresponding quantity of dilute acetic acid. Upon stirring for some time, the condensation product separates almost quantitatively as a thick mass of lustrous bronze needles. These are separated and washed with dilute salt solution. The product can be recrystallized from hot dilute acetic acid containing some HCl to give long red-bronze needles of the formula

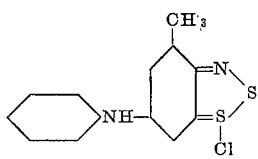

The aniline of the foregoing procedure may be replaced by any other primary aromatic amine which contains no strongly acidic substituent group, such as nitro, carboxyl, sulphonic, etc. Representative examples of these amines are aniline, p-amino phenol, o-amino m-cresol, toluidine, p-amino diphenylamine, m-tolylene diamine, diamino diphenylamine, 4,4′ diamino diphenyl methane, 4,4′ diamino 3-methyl diphenyl methane, alpha naphthylamine, beta naphthylamine, amino methyl naphthalenes, amino phenanthrene, amino diphenyl oxide, p-phenetidine, o-anisidine, 2,4 diamino phenyl naphthyl ether and p-amino dimethyl aniline.

These arylene thiaz thionium chloride derivatives in which the chlorine in the arylene ring para to the attached nitrogen has been replaced by a mono aromatic substituted amino group may be rendered suitable for incorporation into rubber as antioxidants by replacing the remaining chlorine atom by a hydroxyl group or by another mono aromatic substituted amino group.

The replacement by a hydroxyl group may be accomplished by hydrolysis in the presence of a weakly alkaline salt, such as sodium acetate. The following procedure is illustrative.

Fifty grams of 3-methyl 5-phenyl amino phenylene thiaz thionium chloride were stirred overnight in a 20% solution of sodium acetate in water. The solid formed was filtered, washed with water, and air dried. The product softened at 100° C. and melted gradually up to 125° C. The yield was 45 grams. This product may be represented by the formula

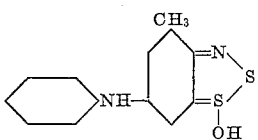

If it is desired to replace both of the original chlorine atoms by the same mono aromatic substituted amino group, both of these replacements may be accomplished in one step.

For example, a solution of 2 grams of SnCl₄.5H₂O in 300 grams of aniline was added to 95 grams of 3-methyl 5-chloro phenylene thiaz thionium chloride and the mixture heated for 15 hours under reflux. At the end of this period, the fraction boiling up to 240° C. was removed by distillation. The residue was powdered and washed with water. The product melted at 160–180° C. The yield was 100 grams. This product may be represented by the formula

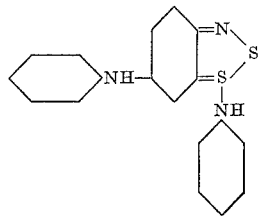

It is not, however, necessary that both chlorines be replaced by the same mono aromatic substituted amino group. The chlorine on the aryl ring may be first replaced using one amine, as in the aforestated example in which were reacted 3-methyl 5-chlor 1-2-phenylene thiaz thionium chloride and aniline to give 3-methyl 5-phenyl amino 1-2-phenylene thiaz thionium chloride having the formula The other chlorine may then be replaced by a different group by reacting the above compound with a different primary aromatic amine than aniline. If alpha naphthylamine be used with 3-methyl 5-phenyl amino phenylene thiaz thionium chloride, the final compound will have the formula

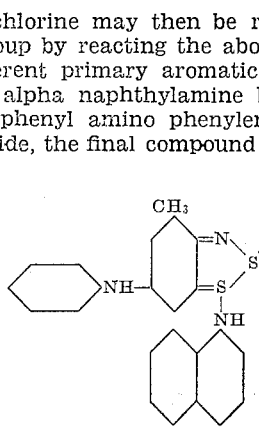

The same list of amines given as examples to replace aniline in the replacement of the chlorine on the aryl ring may be also taken here as exemplary equivalents of alpha naphthylamine.

Thus, the invention includes all compounds of the formula

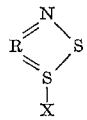

in which R is an aryl group substituted para to the attached nitrogen by a mono aromatic substituted amino group and X is selected from the group consisting of hydroxyl and mono aromatic substituted amino groups, which compounds contain no strongly acidic substituents such as nitro, carboxyl, sulphonic, etc. groups. It is desirable that these acidic groups shall be present neither in the amino substituents nor the arylene ring represented by R.

Following are the structural formulae of some representative compounds coming within the scope of the invention.

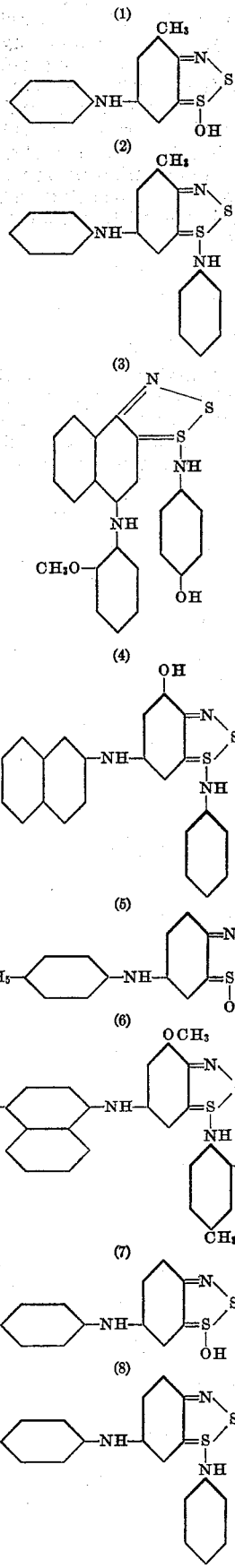

It is not intended that the invention shall be limited to the foregoing examples. They are merely representative compounds.

Neither is the invention limited to the methods of preparation outlined. It is meant to include the compounds of the invention regardless of their method of preparation.

The compounds of the invention may be employed in most of the ordinary rubber formulae. The following is a specific formula in which they have been found by test to yield excellent results.

|  | Parts by weight |
|---|---|
| Extracted pale crepe | 100 |
| Zinc oxide | 5 |
| Sulphur | 3 |
| Hexamethylene tetramine | 1 |
| Stearic acid | 1.5 |
| Age resister | 1 |

Samples were prepared in accordance with this formula, cured, and tested. The results of the tests with several representative materials were tabulated. Included are data both on the original vulcanized samples and on similar samples after ageing 6 days in an oxygen bomb at 50° C. and 150 pounds pressure.

| | Original | | | | After ageing | | | | |
|---|---|---|---|---|---|---|---|---|---|
| Cure | Tens. | Elg. | 500% | 700% | Tens. | Elg. | 500% | 700% | Percent weight inc. |

5-phenyl amino 3-methyl phenylene thiaz thionium hydroxide (Formula 1)

| 35/285 | 103 | 800 | 16 | 58 | 125 | 820 | 18 | 64 | .18 |
| 50 | 134 | 745 | 27 | 102 | 146 | 770 | 25 | 95 | .23 |
| 70 | 130 | 700 | 34 | 130 | 144 | 695 | 37 | ---- | .28 |

Reaction product of 3-CH₃-5-Cl phenylene thiaz thionium chloride and aniline (Formula 2)

| 35/285 | 96 | 825 | 16 | 48 | 110 | 820 | 16 | 55 | .04 |
| 50 | 114 | 815 | 18 | 60 | 118 | 780 | 20 | 74 | .08 |
| 70 | 138 | 775 | 23 | 87 | 128 | 740 | 26 | 100 | .10 |

Reaction product of 5-chloro phenylene thiaz thionium chloride and aniline (Formula 8)

| 35/285 | 78 | 790 | 16 | 47 | 99 | 765 | 19 | 69 | .03 |
| 50 | 108 | 795 | 19 | 63 | 124 | 750 | 25 | 92 | .06 |
| 70 | 139 | 755 | 28 | 100 | 143 | 720 | 33 | 128 | .15 |

These data show clearly the excellent and very desirable age-resisting characteristics of the compounds.

While only the preferred forms of the invention have been described in detail, it will be apparent to those skilled in the art that considerable variation may be made therein without departing from the spirit of the invention or the scope of the appended claims, in which it is intended to claim all features of patentable novelty residing in the invention.

What I claim is:

1. The method of processing rubber which comprises treating it with a compound having the formula

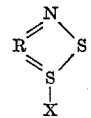

in which R is an arylene group substituted para to the attached nitrogen atom by a mono aromatic substituted amino group and X is selected from the group consisting of hydroxyl and mono aromatic substituted amino groups, which compound is free from strongly acidic groups.

2. The method of processing rubber which comprises treating it with a compound having the formula

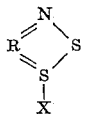

in which R is an arylene group substituted para to the attached nitrogen atom by a mono aromatic substituted amino group and X is a mono aromatic substituted amino group, which compound is free from strongly acidic groups.

3. The method of processing rubber which comprises treating it with a compound having the formula

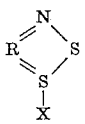

in which R is an arylene group substituted para to the attached nitrogen atom by a mono aromatic substituted amino residue and X is a hydroxyl group, which compound is free from strongly acidic groups.

4. The method of processing rubber which comprises treating it with 5-phenyl amino 3-methyl phenylene thiaz thionium hydroxide.

5. The method of processing rubber which comprises treating it with 5-phenyl amino 3-methyl phenylene thiaz thionium amino benzene.

6. The method of processing rubber which comprises treating it with 5-phenyl amino phenylene thiaz thionium amino benzene.

7. The method of processing rubber which comprises treating it with a compound having the formula

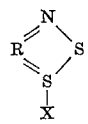

in which R is an arylene group substituted para to the attached nitrogen atom by a mono aryl substituted amino group and X is selected from the group consisting of hydroxyl and mono aryl substituted amino groups, which compound is free from strongly acidic groups.

JAN TEPPEMA.